Dec. 5, 1950     A. H. WALLENTIN ET AL     2,532,973
APPARATUS FOR PROPORTIONING
METAPHOSPHATE TO A LIQUID
Filed Feb. 25, 1948     2 Sheets-Sheet 1
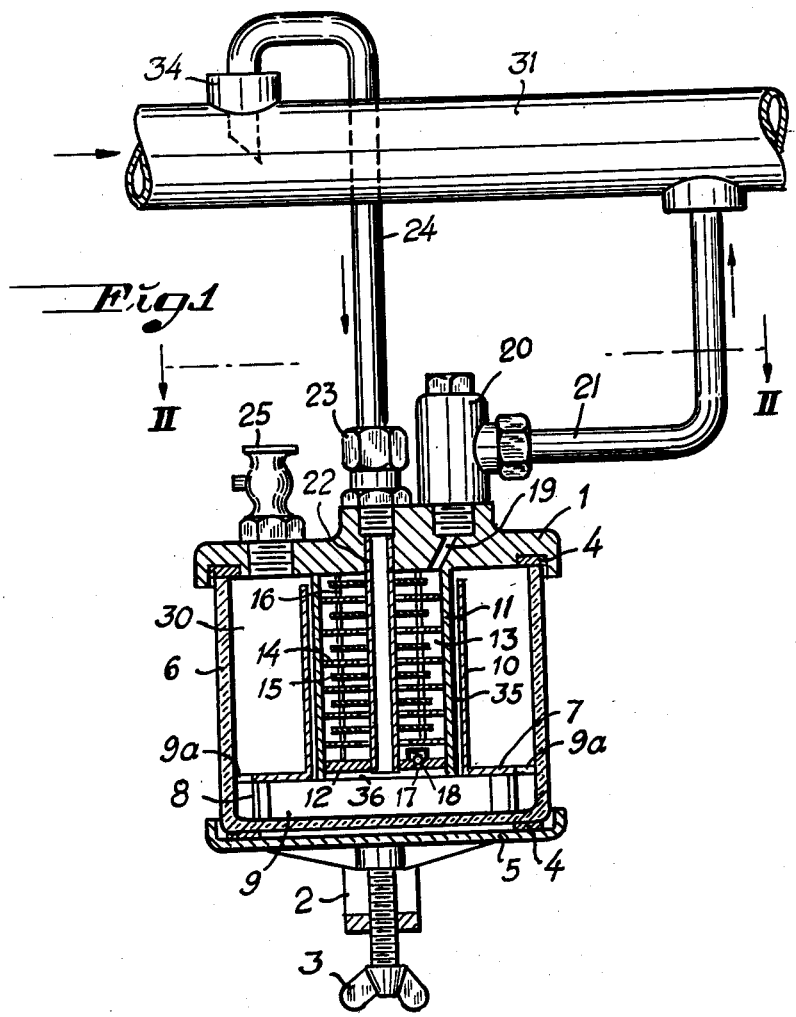
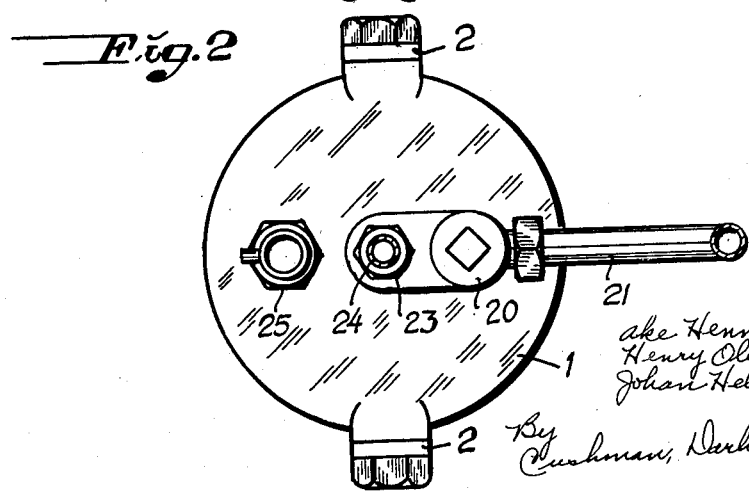

Dec. 5, 1950
A. H. WALLENTIN ET AL
2,532,973
APPARATUS FOR PROPORTIONING
METAPHOSPHATE TO A LIQUID
Filed Feb. 25, 1948
2 Sheets-Sheet 2
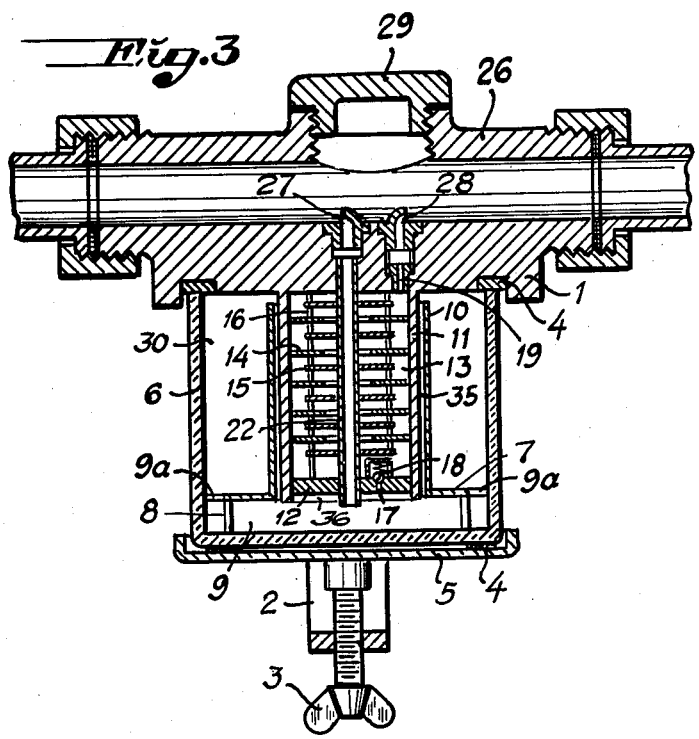
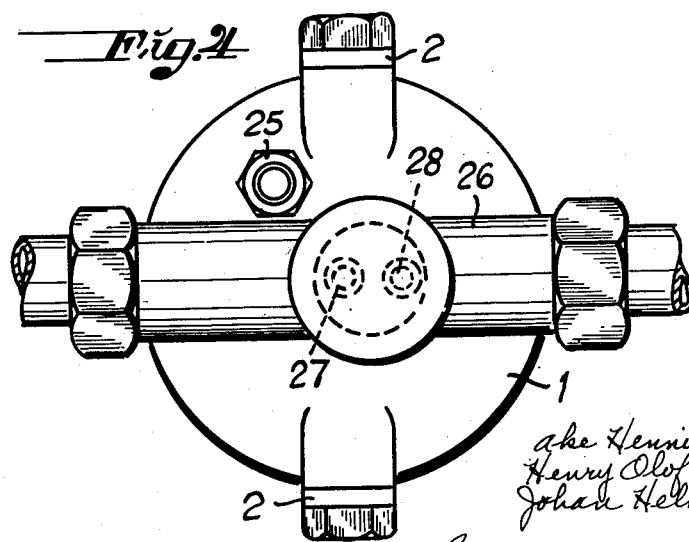

Patented Dec. 5, 1950

2,532,973

UNITED STATES PATENT OFFICE 2,532,973

APPARATUS FOR PROPORTIONING METAPHOSPHATE TO A LIQUID

Åke Henning Wallentin, Henry Olof Carlsson, and Johan Helmer Vesterlund, Goteborg, Sweden Application February 25, 1948, Serial No. 10,774
In Sweden April 9, 1942

Section 1, Public Law 690, August 8, 1946
Patent expires April 9, 1962

2 Claims. (Cl. 210—86)

This invention relates to an apparatus for proportioning metaphosphate to a liquid flowing through a conduit. Various apparatus are known in the art, which are devised to proportionate chemicals to a liquid flowing through a conduit, but as far as we are aware, the previously suggested constructions are not able automatically to proportion an accurate percentage of the chemicals to the liquid independently of the quantity of liquid flowing through the conduit. It has been found difficult to maintain an exact degree of proportioning, particularly in the case where chemicals are to be added to a small quantity of liquid. If metaphosphate is to be supplied to the liquid in small quantities, additional difficulties are encountered due to the fact that a strong solution of metaphosphate forms a tough or highly viscous mass which cannot be passed through narrow passages without the risk of clogging.

This invention has for its object to avoid the above-named inconveniences and to provide an apparatus by means of which metaphosphate can be supplied to a liquid at accurate rates and independently of the velocity at which the liquid is flowing through the conduit.

In order that the invention may be better understood, reference is had to the accompanying drawings, in which:

Fig. 1 is a vertical sectional view of an apparatus constructed in accordance with the invention. Fig. 2 is a plan view thereof as viewed from line II—II, Fig. 1; Fig. 3 is a vertical sectional view of a modified embodiment; and Fig. 4 is a plan view thereof.

Referring to Figs. 1 and 2, the apparatus illustrated comprises a cover 1 to which is secured an outer receptacle 6, preferably consisting of some transparent material, such as glass, the receptacle being secured to the cover by means of a strap 2 and a tightening screw 3 with the aid of packings 4 and a plate 5. Inserted into the receptacle 6 is an annular plate 7 provided with distance pieces 8 standing on the bottom of the receptacle 6 such as to form a small or shallow reservoir 9 immediately above the bottom of the receptacle 6. The plate 7 has a plurality of openings 9a. Secured to the inner edge of the plate 7 is a hollow cylindrical part 10 which extends approximately, but not entirely, up to the cover 1. Arranged within the part 10 and slightly spaced therefrom is a cylindrical mixing chamber 13 having its side walls 11 extending down to the same level as the plate 7, said mixing chamber being closed at the bottom by means of a bottom plate 12 screwed into the same. As will be seen from Fig. 1, the side walls of the mixing chamber 13 project slightly below the bottom plate 12. Inserted into the mixing chamber are plates 14 provided with large apertures in their central portions, said plates extending close to the wall 11, and alternating with said plates there are small plates 15 having smaller central openings, said plates being held in position by distance pieces 16.

Provided in the bottom plate 12 is an opening 17 with a check valve 18 adapted to prevent return flow of liquid from the mixing chamber 13 to the reservoir 9 and to prevent diffusion to the chamber 13 when the apparatus is not in operation. Extending through the cover 1 is a passage 19 leading to a nipple 20 connected to an outlet pipe 21, said nipple being provided with a calibrated nozzle or like member. Extending through the mixing chamber 13 is a pipe 22 which is connected through a nipple 23 to an inlet pipe 24 and which extends downwards through the bottom plate 12 and opens near the top of the reservoir 9. The cover 1 is further provided with a vent valve 25. An annular storage chamber 30 is defined by the cover 1, plate 7, the walls of the receptacle 6, and the cylindrical part 10. The inlet pipe 24 and outlet pipe 21 are, in a manner known per se, connected to the conduit 31 for the liquid to be treated, if desired, a check valve 34 may be inserted into the pipe 24. The upper end of the pipe 24 projects into the conduit 31 and is cut at an angle so as to provide a take-up for part of the liquid passing through the conduit 31.

The apparatus having been mounted in place, and the pipes 21 and 24 having been connected to the conduit 31 of a liquid supply system, the storage chamber 30 is filled with metaphosphate, preferably in a solid state. After liquid has been filled in through the opening of the vent valve 25, the metaphosphate will be dissolved and a strong solution thereof will flow down through the openings 9a into the reservoir 9. A small portion of the liquid flowing through the main conduit 31 will pass through the inlet pipe 24 and the pipe 22 so as to enter the upper portion of the reservoir 9 whence it will return to the main conduit 31 through the opening 17, mixing chamber 13, passage 19 and outlet pipe 21. Since the specific weight of a strong solution of metaphosphate is greater than the specific weight of a weak solution, it follows that the strongest portion of the solution will sink down from the storage chamber 30 into the small reservoir 9, and said reservoir will consequently contain a solution of substantially constant concentration. Only when the major portion of the metaphosphate has been supplied to the liquid, the degree of concentration will be reduced in the reservoir 9. Then, the storage chamber has to be charged with fresh metaphosphate.

As the specific weight of the liquid, such as water, flowing down through the pipes 24 and 22, is lower than the specific weight of the strong solution of metaphosphate in the reservoir 9, the liquid will not sink down into the reservoir, but will directly flow to the outlet opening 17, and will sweep along part of the surface of the metaphosphate solution in the reservoir 9, and will pick up a small amount of metaphosphate, said amount being dependent upon the amount of liquid flowing per unit of time through the apparatus, which amount in turn is dependent upon the amount of liquid flowing through the main conduit 31.

By reason of the zig-zag way which the liquid returning to the mixing chamber 13 is caused to assume therein, the metaphosphate picked up in the reservoir 9 will be thoroughly mixed with the liquid before the liquid is returned to the main conduit. According as solution of metaphosphate in the reservoir 9 is taken up by the liquid, a corresponding amount of fresh solution will sink down from the storage chamber 30, while liquid will leak up into the top of the storage chamber through the clearance 35 between the walls 10 and 11, said liquid coming from the space 36 located below the lower face of the bottom plate 12 and between the downwardly projecting portions of the walls of the mixing chamber 13.

Since there is always a strong solution of substantially constant concentration in the reservoir 9, a uniform proportioning will take place to the liquid flowing through the main conduit, independently of how much or at how long intervals liquid flows through the conduit.

In the modification shown in Figs. 3 and 4, the cover 1 has a pipe 26 arranged thereon, said pipe being directly connected to the main conduit. Here, the nipples 23 and 20 shown in Fig. 1 are replaced by inlet and outlet nozzles 27 and 28, respectively, which are shaped in such a manner that a portion of the main stream of liquid is forced to pass through the apparatus. The nozzles are accessible from the outside by an opening normally closed by a cover 29 on the upper side of the pipe 26. In other respects, the various parts and the mode of operation are the same as in the embodiment shown in Figs. 1 and 2.

If the apparatus is used for the treatment of water, the storage chamber may contain a strong solution of sodium-metaphosphate, preferably poly-sodium-metaphosphate, such as sodium-hexametaphosphate, $(NaPO_3)_6$, or sodium-hexametaphosphate admixed with a buffer which is capable of preventing the precipitation of lime and rust, and of preventing corrosion and removing deposits already present in the system. A strong solution of sodium-hexametaphosphate is stable and may be kept standing for a very long time without decomposing.

The length of the way over which the flow of water has to pass in contact with the poly-phosphate solution may be adapted to such a value that between 0.5 and 3.5 grams of sodium-hexametaphosphate will be introduced per liter into the stream branched off the main stream of water, preferably such that finally about 2 milligrams of phosphate per liter will enter the main stream. From the main stream of water to be treated, preferably 1/100 to 1/2000 is branched off and conducted to the apparatus.

What we claim is:

1. An apparatus for proportioning metaphosphate to a liquid flowing through a conduit, comprising in combination a substantially annular storage chamber adapted to receive metaphosphate, the bottom of said chamber having at least one opening, a reservoir located below said chamber and having a smaller depth than said chamber, said reservoir being adapted to receive, through said opening, strong metaphosphate solution sinking down from said chamber, a mixing chamber located within the inner walls of said storage chamber and above said reservoir and having a bottom and side walls which slightly project below the bottom of the mixing chamber, an inlet pipe for supplying to the apparatus a small portion of the liquid flowing through said conduit, said pipe extending downwards through the bottom of said mixing chamber and opening near the top of said reservoir, the bottom of said mixing chamber having an inlet opening for liquid admixed with metaphosphate, said inlet opening connecting the reservoir with the mixing chamber, and means for connecting said mixing chamber with said conduit, said inlet pipe projecting into said conduit so as to provide a take-up for part of the liquid in the conduit and to cause said part to flow through the inlet pipe, reservoir and mixing chamber, and back to said conduit.

2. An apparatus as claimed in claim 1 and further comprising a check valve adapted to prevent flow of liquid from said mixing chamber to said reservoir through the inlet opening in the bottom of said mixing chamber.

ÅKE HENNING WALLENTIN.
HENRY OLOF CARLSSON.
JOHAN HELMER VESTERLUND.

REFERENCES CITED

The following references are of record in the file of this patent:

UNITED STATES PATENTS

| Number | Name | Date |
|---|---|---|
| 412,910 | Blessing | Oct. 15, 1889 |
| 842,088 | Elfreth | Jan. 22, 1907 |
| 846,100 | Estep | Mar. 5, 1907 |
| 1,084,380 | Williams, Jr. | Jan. 13, 1914 |
| 1,193,038 | Mann | Aug. 1, 1916 |
| 1,335,802 | Stewart | Apr. 6, 1920 |
| 1,409,248 | Sevcik | Mar. 14, 1922 |
| 2,067,328 | Lux | Jan. 12, 1937 |